United States Patent
Schuessler (10) Patent No.: US 6,802,449 B2
(45) Date of Patent: Oct. 12, 2004

(54) INK-SPREAD COMPENSATED BAR CODE SYMBOLOGY AND COMPENSATION METHODS

(75) Inventor: Frederick Schuessler, Baiting Hollow, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/608,833

(22) Filed: Jun. 26, 2003

(65) Prior Publication Data

US 2004/0084540 A1 May 6, 2004

Related U.S. Application Data

(62) Division of application No. 10/013,400, filed on Dec. 10, 2001.
(60) Provisional application No. 60/256,007, filed on Dec. 15, 2000.

(51) Int. Cl.[7] .......................... G02B 26/10; G06K 19/06; G06K 7/10; G06K 9/22
(52) U.S. Cl. ................................. 235/462.25
(58) Field of Search ........................ 235/462.5, 462.07, 235/462.15, 462.16, 456, 494

(56) References Cited

U.S. PATENT DOCUMENTS

| | | | |
|---|---|---|---|
| 4,074,852 A | * | 2/1978 | Wescott et al. ........ 235/462.18 |
| 4,354,101 A | | 10/1982 | Hester et al. |
| 5,468,946 A | * | 11/1995 | Oliver ................... 235/462.07 |
| 5,514,858 A | | 5/1996 | Ackley |
| 5,619,027 A | | 4/1997 | Ackley |
| 5,777,309 A | | 7/1998 | Maltsev et al. |
| 5,850,080 A | * | 12/1998 | Herzig ....................... 235/494 |
| 5,853,252 A | * | 12/1998 | Wright et al. ............... 400/103 |
| 5,877,486 A | | 3/1999 | Maltsev et al. |
| 5,889,270 A | * | 3/1999 | van Haagen et al. ... 235/462.15 |
| 6,247,646 B1 | * | 6/2001 | Iwaguchi et al. ...... 235/462.04 |
| 6,556,690 B1 | * | 4/2003 | Nelson ........................ 382/100 |

* cited by examiner

*Primary Examiner*—Thien M. Le
*Assistant Examiner*—Edwyn Labaze
(74) *Attorney, Agent, or Firm*—Carter, Deluca, Farrell & Schmidt, LLP (57) ABSTRACT

A method for producing an ink-spread compensated variant of an existing optical code encodation scheme, wherein the existing encodation scheme has printed areas and spaces having a length in at least one dimension being a function of a given unit length for encoding information. In the method, the pattern of printed areas and spaces for a given data input is determined and a given length is added to the length of each space while the length of the printed areas remains unchanged to enlarge the overall length of the resulting code symbol in the at least one dimension.

24 Claims, 3 Drawing Sheets

INK-SPREAD COMPENSATED BAR CODE SYMBOLOGY AND COMPENSATION METHODS

CROSS-REFERENCE(S) TO RELATED APPLICATIONS

This application claims priority under 35 U.S.C § 119 to U.S. Provisional Application Ser. No. 60/256,007, filed on Dec. 15, 2000 and entitled "Ink-Spread Compensated Bar Code Symbology And Compensation Methods," the entire contents of which is expressly incorporated herein. This application is a divisional of U.S. patent application Ser. No. 10/013,400 filed on Dec. 10, 2001.

FIELD OF THE INVENTION

The present invention relates to a new method of pre-compensating for ink spread (often called "print gain" or "dot gain") before printing a bar code or binary code.

BACKGROUND

There are two encoding schemes commonly used in modern bar code symbology design, "Binary" encoding and ("n,k)" encoding. Each have their advantages and disadvantages; generally speaking, (n,k) encoding is more space-efficient, but Binary encoding is more tolerant of poor printing. Thus, both types will continue to be widely used for the foreseeable future. "Binary" codes (such as Code 39) define the set of bar/space patterns making up its "language" or bar code character set using only two choices ("wide" or "narrow") for each bar and space of each pattern. The wide:narrow ratio can be selected when printing each bar code. Selecting a 2:1 ratio creates a more compact bar code; a 2.5:1 or 3:1 ratio makes the bar code wider, but also makes it easier for the scanner to distinguish wide elements from narrow ones (helpful when printing on rough cardboard, for example). "Delta Distance" codes (Such as UPC-A and Code 128) use an encoding scheme known as (n,k) encoding, to define the set of bar/space patterns making up its "language" or bar code character set. In an (n,k) code, each bar code character is comprised of "k" bars and "k" spaces (eg, 3 bars and 3 interleaved spaces), and each individual bar and space is an integer multiple (1,2, . . . m) of a unit width (called a "module"). Unlike the case for Binary codes, these ratios cannot be altered to accommodate difficult printing situations.

One characteristic that the Binary and (n,k) encoding schemes share is that they both define a unit width (called a module), and in either scheme, the narrowest bars and the narrowest spaces are both one module wide. Ideally, every printed barcode would be printed exactly to specification, in order to allow a maximum tolerance for noise and other distortions during the scanning process. In practice, however, the printing process can introduce a variety of imperfections, many of these resulting from imperfections in the paper (or other substrate) that the bar code is printed upon. These substrate imperfections may introduce random errors in the positions of the edges that separate dark bars from light spaces within the bar code.

One substrate-induced error stems from the fact that different substrates vary (and even different pages of the same substrate vary) in how they absorb ink at the time of printing. The result is that, on a given sample of a substrate, the dark areas (bars) of a bar code may be significantly wider than the spaces that were nominally of the same width. Yet, on a different sample, the same bar code digital image may result in a printed symbol where the bars are narrower than nominal, rather than wider. It is usually the case, however, that on a given printed sample, all of the printed dots tend to show the same amount of "dot gain" (or loss). Therefore, all of the bar code's bars tend to be either bigger than nominal (and by the same amount), or all are smaller (and by the same amount). Thus, from the perspective of reading a bar code, this dot-gain phenomenon is considered a systematic (not random) error, and is known as "uniform ink spread."

Uniform ink spread is such a common printing problem that current symbology designs almost always rely on a technique called "edge to similar edge decoding" (also called "delta distance decoding") to handle it. Ink spreads uniformly outwardly from the center of each printed dot, and therefore the left and right edges of every printed bar will move outwardly (from the bar's center) by equal amounts. Thus, a measurement taken from the left edge of one bar, across the bar and the next space, to the left edge of the next bar, will not vary with the degree of ink spread. Some bar code symbologies, such as Code 128, were designed to be decoded based on such "edge to similar edge" measurements and thus are relatively immnune to uniform ink spread.

Unlike codes such as Code 128, binary codes are typically not decoded using "delta distance decoding" techniques and thus do not have the same inherent immunity to ink spread. However, various techniques for decoding binary codes (by estimating a "threshold" width, ideally halfway between the nominal wide and nominal narrow widths) are well known in the art, and can provide good immunity to ink spread and other printing errors.

Although "delta distance decoding" and other decoding techniques known in the art address some problems caused by ink spread, there is a remaining problem with ink spread that is not solved by these techniques. This problem is that when narrow (1-module) spaces shrink due to ink spread, they can become so narrow that they may not be seen at all by the scanner (or at the least, will reduce the effective working range of the scanner). So, even with "delta distance" codes, some form of ink spread control is required. This is done by adjusting the ideal representation of the bar code before printing it, a process often known as "pre-compensation" of the image.

Traditional ink-spread pre-compensation methods involve reducing the width of each printed bar with an exactly corresponding increase in the width of each space (or the opposite—increasing the bar width and decreasing the space—in those rare cases where the expectation is for a consistently under-inked printing process). For example, one might adjust the ideal bar code image by replacing the last column of black pixels of every bar with a column of white pixels (i.e., "shaving" one dot from the right edge of every bar). The advantage of this traditional approach is that the decoding technique, as described above, gives an identical edge-to-similar-edge measurement, whether compensation was applied or not. The major disadvantage is that, by definition, the bar code image contains bars that are less than 1 module wide. This creates two significant problems.

First, if, in a given instance of printing, the ink does not spread, the printed code will have bars that are smaller than nominal. This condition can degrade scannability. Similarly, if the ink-spread phenomenon is not consistent from one printed sample to another, then the traditional pre-compensation method will sometimes improve system performance, and sometimes degrade it.

Second, the compensated image now contains "finer" lines than before. It is common for the same page-layout file to be used for printing on presses with different physical resolutions (i.e., the physical distance between dots of the printer vary significantly across printing processes). The last step in the publishing chain, called Raster Image Processing, maps the image to the addressable dots of the printer. This stage, and previous stages, can introduce rounding or scaling errors in the widths of the bars and spaces. The thinner the bars, the more likely that the process will create an occasional bar that is much too wide or narrow, resulting in an unreadable barcode.

Thus, in order to avoid both of these problems, the ideal pre-compensation method would not decrease the size of any bars or spaces of the bar code.

The use of bar codes in printed advertisements and newspaper text is expected to increase significantly in the near future, as the cost of Internet-enabled scanning devices becomes low enough for the consumer mass market. Currently, several methods have been proposed for using a printed bar code for automatically connecting to an appropriate site on the World Wide Web. As a result of this and other applications, it will become increasingly common to print the same bar code image, and the same advertisement containing a bar code image, in a variety of print media including magazines, newspapers, catalogs, and telephone directories (white pages and yellow pages). Each of these print media typically has its own combination of printing press technology. (such as gravure, offset, and flexography) and paper (ranging from high-weight glossy paper in magazines, to recycled newsprint and the very low-weight paper used in a telephone book), each variation of which may have different ink spread characteristics. Therefore, as consumer scanning applications proliferate, it will no longer be feasible to generate a single bar code image, or a single ad containing a bar code, that will be appropriately pre-compensated for all of the substrates it will be printed on, using traditional pre-compensation techniques.

SUMMARY OF THE INVENTION:

A main object of the present invention is to provide a method for print gain compensation that does not reduce the widths of any elements of a bar code or binary code.

Another object of the present invention is to provide a bar code symbology, where the ideal image of the bar code does not require further compensation for ink spread or reduction, and therefore is more suitable than current symbologies for printing in a wide variety of press processes, to a wide variety of paper and other substrates.

A further object of the present invention is to provide a method for print gain compensation by designing a symbology that does not contain any spaces as small as the nominal narrowest bar width, so as to minimize the negative effects of ink spread.

Yet another object of the present invention is to provide a bar code symbology, where the reading system can automatically discriminate between the standard version of the symbology, and one or more versions that have been pre-compensated for print gain using the techniques of the present invention.

Yet a further object of the present invention is to provide a method for decoding a pre-compensated symbology.

These and other objects and advantages of the present invention are achieved in accordance with the present invention in which pre-compensation is applied to an existing optical code encoding scheme wherein the digital image of the code increases the width of the spaces, but does not reduce or increase the widths of the bars. In particular, and in accordance with one embodiment of the method of the present invention, the pattern of printed areas and spaces for a given data input is determined and a given length is added to the length of each space while the length of the printed areas remains unchanged to enlarge the overall length of the resulting code symbol in the at least one dimension.

The resulting bar code image will result in a robust printed symbol, even if the final printing stage introduces no dot gain, or even exhibits dot loss rather than dot gain. The method according to the present invention, while particularly suitable for bar codes and in particular for n,k bar codes, can be used with other types of optical codes, such as binary codes, that suffer from ink spread problems.

The existing optical code symbology is preferably a bar code having bars and spaces of varying widths and wherein the added given length is a function of the width of the narrowest space. Preferably, the bar code is an n,k bar code and wherein the added length is a function of a module width of the resulting bar code symbol. In a preferred embodiment, the added length is x modules where $0 < x \leq 2$ and most preferably the added length is 0.5 or 1 module.

In a particularly commercially advantageous embodiment of the present invention, wherein the n,k bar code is an 11,3 bar code wherein the bars and spaces are from 1 to 4 modules in length. A bar code of this type is described in U.S. patent application Ser. No. 60/237,639, the entire contents of which are hereby incorporated by reference.

In another embodiment of the invention, the code symbology is a two-dimensional code symbology and preferably it is a bar code and most preferably an n,k bar code, such as PDF417. In a further embodiment of the invention, auto-discrimination is added to the resulting code symbol to enable a reader to determine that the code symbol is an ink-spread compensated variant for the decoding thereof. In one embodiment, the auto-discrimination is added by using different data characters than in the existing symbology. Alternatively, auto-discrimination comprises using a different subset of codewords than in the existing symbology. In another variation, auto-discrimination is added by using a unique data character pattern to identify the code symbol as an ink-spread compensated variant. Further, auto-discrimination can be added by providing a unique start pattern in the resulting code symbol, a unique stop pattern in the resulting code symbol or both. The auto-discrimination can also be added by providing a unique finder pattern in the resulting code symbol.

A method in accordance with the invention of decoding an ink-spread compensated variant of an existing n,k bar code symbology produced in accordance with the invention comprises discriminating that the bar code symbol is an ink-spread compensated variant and what the amount of the added length, normalizing the width of a character to add the total added length and varying the threshold for the spaces to include the length added thereto.

An ink-spread compensated n,k bar code symbology in accordance with the invention comprises characters having k bars and k spaces of varying width, wherein the width of each bar is from 1 to m modules in length and wherein the width of each space is from 1+x to m+x modules in length, wherein $0 < x \leq 2$ modules in length, and wherein the overall length of each character is n+kx modules. Preferably, the n,k bar code is an 11,3 bar code wherein the bars and spaces are from 1 to 4 modules in length and most preferably x is 0.5 module or 1 module.

BRIEF DESCRIPTION OF THE FIGURES

The foregoing and other features of the present invention will be more readily apparent from the following detailed description and drawings of illustrative embodiments of the invention in which.

DETAILED DESCRIPTION OF THE PREFERRED EMBODIMENTS

According to the present invention, a bar code symbology is modified to compensate for ink spreading by increasing the width of the spaces without decreasing the width of the printed lines. This new technique is that it is inherently safer than conventional compensation techniques when the amount of ink spread is unknown (e.g., when the same bar code image in a print ad goes to both newspapers and magazines, and will be printed on a variety of paper substrates).

The technique of "Delta Distance Decoding" is sufficient to fully compensate for variable amounts of ink spread, except for the fact that too much ink spread will cause the narrow spaces of the bar code to become so small as to negatively affect scanner performance. Traditional pre-compensation techniques address this problem by reducing the size of the printed bars to thereby make the adjacent narrow spaces larger, at the expense of the adjacent narrow bars, which can become smaller than nominal.

Use of the present invention raises two primary concerns. First, the new method makes the bar code somewhat larger (it grows by about 13% when "1.5 spaces" are used, and by about 27% when "2X spaces" are used). Second, unlike the traditional bar-shaving method, the present method requires that the decoder determine or auto-discriminate whether or not a given barcode has been pre-compensated in this new way. Given these concerns, the present method is most useful when the amount of ink spread is not known in advance.

Two methods for auto-discrimination are disclosed in detail below: (a) creating a variant of the symbology (e.g., changing the Stop pattern of a code disclosed in the aforementioned pending application, hereinafter referred to as a Scanlet, or using Code 128 with characters of the opposite bar parity), and (b) using only a subset of the encodable character set for the first data character to "flag" the compensated version. For instance, if Code 128 characters are used, characters containing "T distances" that are all either 3X or 4X (before pre-compensation) decode properly whether or not the decoder "thinks" that compensation is present.

To apply the new pre-compensation technique to any defined (n,k) character set, a new "stretched" version of the set is defined in which the bar widths are unchanged but all of the space widths of each character are increased by the same amount (typically either by 0.5X or by 1X). This creates a "new" bar/space character set that can be trivially mapped back to the original set by simply subtracting that fixed amount from each measured T distance.

For example, Code 128 character set is a (11,3) code (each pattern comprises 11 modules, and contains 3 bars and 3 spaces) and is shown below as Table I. Applying the present methodology using 2X spaces to maximize tolerance to ink spread produces a "stretched" (14,3) character set. In this new set, each of the three spaces of each pattern have been increased by 1X, so a total of three modules have been added to each pattern, but no 1X spaces have been used. The resulting set of patterns can be thought of as identical to the original Code 128 set, except that:

Each set of 3 bars and 3 spaces must be normalized against 14 modules when decoding, rather than against 11, and Each T distance that is calculated during the decode process must be decreased by 1 before the pattern lookup occurs.

For example, as normally printed, the bars and spaces of the Code 128 symbol character "00" have the series of widths 2,1,2,2,2,2 (in the order bar, space, bar, space, bar, space). Summing each pair of adjacent elements, this forms a "T sequence" of 3,3,4,4,4. Applying the present invention using 2X minimum spacing produces a new width sequence of 2,2,2,3,2,3 where the widths of the bars are unchanged, but the width of each space is increased by 1X. The new T sequence for this pattern is 4,4,5,5,5, when normalized against 14 modules.

The normalization process starts by assuming that the overall character width "p" (in this case the width of a set of 6 bars and spaces) represents a predetermined number of modules (11 for standard Code 128, but 14 for "2X-Stretched" Code 128). Then, each edge-to-similar-edge measurement is converted to an integer.

For example, assume that a laser spot traveled across this pattern at a certain rate so that crossing a 1-module bar took 100 microseconds, and crossing a 2-module bar took 200 microseconds, and so on. The resulting measurements from crossing the "stretched" pattern (if no ink spread occurred) would be 200, 200, 200, 300, 200, and 300 microseconds. The character width is 1400 microseconds, the sum of these six measurements.

To calculate the T distances, the traversal rate for adjacent bars b and spaces s are summed, multiplied by the expected number of modules, and divided by the total traversal time. In the present example, the first T distance is $((b1+s1)*14)/p = ((200+200)*14)/1400 = 4$. Continuing these calculations produces a T sequence for the stretched pattern of 4,4,5,5,5. Subtracting 1 from each T distance re-creates the original "unstretched" sequence of 3,3,4,4,4. This sequence can then be decoded to find the intended value "00".

As will be recognized, to arrive at the right calculations, the decoder needs to know to normalize over 14 modules rather than 11. Surprisingly, in the particular case of (11,3) characters whose T distances are all either 3 or 4, it turns out that the mathematical error introduced from mistakenly normalizing against 11 modules instead of 14 maps closely to the correct value for the original "unstretched" character.

For example, for the first T distance of the "stretched" character, the calculation becomes $((200+200)*11)/1400 = 3.14$ (very far from the printed distance of 4, but very close to the "original" T of 3). A stretched T of 5 (that was originally a T of 4), when mis-normalized against 11, comes even closer to the intended value. In this example, $((200+300)*11)/1400 = 3.93$. This property can be useful as an auto-discrimination method (see below). More generally, the error introduced for T distances of 2, or for T distances larger than 4 becomes significant and therefore, except for certain character patterns, it is important to normalize against the correct number of modules (in this example, 14 instead of 11).

It should also be noted that, if the printing process is generally adequate in terms of well-placed edges, and ink-spread is the only problem to be addressed, then this technique is advantageous, compared to the alternative of simply printing the symbol at twice the X dimension (which would also result in 2X as the minimum width, but for both bars and spaces). Doubling the X dimension makes the symbol character 100% larger, whereas "stretching" the spaces to 2X makes the symbol character only (14/11) or 27% larger, yet still doubling the width of the narrow spaces for maximum ink spread tolerance.

Although patterns stretched by 1X have been discussed above, the pre-compensation technique can "stretch" each space by amounts other than 1X. Stretching by 0.5X, for example, results in a smaller size penalty (each character grows from 11X to 12.5X, rather than to 14X), while still providing ample tolerance for ink spread (50% ink spread, a substantial amount, will merely reduce the 1.5X spaces back to their "original" 1X).

The new pre-compensation method of the current invention may be applied to any binary or "edge to similar edge decodable" symbology (usually characterized as an (n,k) symbology), either already in existence, or in a new symbology. To apply it to an existing symbology, however, some usage convention (within a closed system or other controlled application) or differentiating feature should be added to the symbology to inform the decoder that wider spaces are being employed. A "usage convention" technique will be described in the first preferred embodiment below. A "differentiating feature" technique for open systems (which could consist of a new Start and/or Stop pattern, or use of an alternate parity subset of the same (n,k) patterns), will also be described below.

The simplest form of usage convention would be a prior agreement to utilize only the print gain tolerant variant of a chosen symbology. For example, it could be agreed by the printing and scanning parties to a closed-system application that Code 128 barcodes will always be printed using 1.5X wide spaces.

A simple usage convention suffices for gain tolerant Binary codes, because a well-chosen combination of printing and decoding techniques can allow standard and gain-tolerant Binary codes to be transparently intermixed in the same system. For example, the standard "Factor R" Code 39 decode algorithm (as disclosed in the AIM symbology specification), if applied to Code 39 symbols printed at a 3:1 wide:narrow ratio, works about as well for symbols with 2X narrow spaces as for traditional symbols with 1X narrow spaces. Alternately, the convention could specify an alternate decoding technique (which sets separate thresholds for bars and for spaces) which would work identically whether a 2:1 symbol (i.e., using 1X and 2X bars) was printed using 1X and 2X spaces, 1.5X and 2.5X spaces, or 2X and 3X spaces. As can be seen, the auto-discrimination issue is fairly easily solved for the case of Binary codes, and so the remainder of this discussion will focus on ways to auto-discriminate gain-tolerant versions of (n,k) codes.

A more flexible scheme would utilize a data convention designed to allow both standard Code 128 and print-gain-tolerant Code 128, for example, to coexist in the same application. For example, it could be agreed by the printing and scanning parties to a closed-system application, that Code 128 barcodes starting with certain numbers were printed with standard 1X narrow spaces, whereas Code 128 bar codes starting with certain other numbers were printed with 1.5X narrow spaces. In the case of Code 128, certain symbol character patterns, such as the one representing "02", happen to use values of either 3 or 4 for all of their edge-to-similar-edge measurements. As shown above for the case of 2X minimum spaces, these values decode with very little error, when printed as a 12.5X character but mistakenly normalized against 11 modules. As an example, for the first T distance of the 1.5X "stretched" character, the "mis-normalized" calculation becomes ((200+150)*11)/1250= 3.08 (very far from the printed distance of 3.5, but very close to the "original" T of 3). A stretched T of 4.5 (that was originally a T of 4), when mis-normalized against 11, comes even closer to the intended value. In this example, ((200+ 250)*11)/1250=3.96.

Thus, these patterns (that originally contained only 3X and 4X T distances) could be used in the first data position (by convention) such that one subset of these patterns only appear in the 1.0X symbols, while a second subset of them only appear in the 1.5X symbols. These patterns will decode correctly using an 11X width even if they are printed in a stretched 14X format. The decoder could auto-discriminate the narrow space width being used simply by decoding the first character (assuming a standard 11X character width) and checking which subset of those reserved patterns it was.

The technique just disclosed, of reserving certain patterns to denote the "wider" version of the characters, is simple to apply to an existing symbology design, but it can be relatively inefficient because the first data character pattern no longer carries a full range of data. For a new symbology design, a preferred auto-discrimination technique is to define variations of the symbology's Start and/or Stop patterns and/or data-character patterns, so that the decoder could ascertain the narrow space width from the choice of patterns employed. If the recognition of variants is based on Start and/or Stop patterns (as opposed to using alternative subsets of data-character patterns), it would further be desirable to define these alternate sets of Start/Stop patterns in such a way that a common "finder" routine could identify either version, without doubling the computation requirements of the "finder" process. Therefore, two additional preferred embodiments are disclosed below, one using an alternate set of data character patterns, and one using alternate sets of Start and Stop patterns.

For each given n,k symbology used as a starting point for the application of the techniques described herein, there can be one or more different preferred embodiments of this invention. This is because the design of variations of either the data characters, or of the Start and/or Stop characters, depends both on the standard patterns for each symbology, and on the other symbologies that will also be in use in a given application. One n,k symbology shown in FIG. 1, called Scanlets, is a consumer-oriented bar code that is a particularly appropriate starting point, because of the expectation that printed Scanlets will be generated from an unusually large number of sources, with less control over print gain than is typical for bar codes in industrial applications.

Standard Scanlets use the standard (11,3, E) data characters of Code 128 (eleven modules per character, consisting of 3 bars and 3 spaces, where the sum of the bars is always an Even number of modules). A second, print-gain-tolerant, version of Scanlets can be easily defined, by using the same Start and Stop patterns (except that the spaces are all incrementally wider than standard), but using data character patterns (and check character patterns) that are nominally (11,3) patterns, but where the Odd subset, rather than the even subset, is used, such that the sum of the bars is always an odd number of modules, and where the spaces are all widened by a predetermined amount (for example, by 1X).

Table II is an odd-parity character encodation that can be ink-spread compensated according to the present invention. For the odd-parity Scanlets in Table II, only 103 values are needed and the others would be excluded. (For example, values 0 and 101 would be excluded, because they begin or end with four narrow elements in a row).

In this embodiment, the decoding process is quite similar to that for unmodified Scanlet decoding except that the character set table needs to list the patterns for both the odd and even subsets of patterns. Since the Start and Stop patterns for standard Scanlets were defined to minimize symbol size, and since this embodiment uses the same patterns (widened only by the print-tolerant spaces), this approach creates a minimum-sized symbology variant. However, this embodiment does not allow the decoder to pick between the two variants (for example, 1X spaces, vs. 1.5X spaces) based on the start and stop patterns alone. Therefore, it requires the decoder to try both decode approaches (i.e., assuming 11X characters with 1X spaces and even parity, then assuming 12.5X characters with 1.5X spaces and odd parity), until one assumption results in an invalid character. In the worst case (which would be very rare, but not impossible), all characters will decode both ways, and the decoder would need to choose the "best fit" one (i.e., the assumption that resulted in decode measurements that were closer to nominal). Various selection and best fit techniques known to those of skill in the art could be used for this purpose.

One preferred embodiment of how Scanlets could be adapted to use the present invention, using unique Start and unique Stop patterns, is disclosed herein. Varying both patterns is preferred, as it provides a self-check that the correct version has been discriminated. In this embodiment, a total of three variants of Scanlets, offering varying degrees of print gain tolerance, can be auto-discriminated. One of these versions is a standard Scanlet which offers no extra degree of print gain tolerance. The two new versions, described herein, are called "Gain Tolerant" or GT Scanlets. These versions compensate for anticipated print gain by increasing the width of the spaces, without a corresponding decrease in the width of the bars. Therefore, these gain-tolerant versions may be utilized when the same Scanlet image will be printed to various press/substrate combinations, with varying or unknown amounts of ink spread. A single image may be safely used for printing systems with variable amounts of print gain (or reduction), because the narrow bars need never be less than 1X wide. If even more gain tolerance is desired, traditional bar width reduction (shaving) can be applied to a GT Scanlet image.

The GT versions of Scanlets use the same set of symbol character patterns as do standard Scanlets, except that the three spaces of each pattern are each increased by 0.5X (in GT15 Scanlets) or by 1.0X (in GT20 Scanlets). The bars in all versions of Scanlets are either 1, 2, 3, or 4 modules wide. The spaces in GT15 Scanlets are 1.5, 2.5, 3.5, and 4.5 modules wide, and the spaces in GT20 Scanlets are 2, 3, 4, and 5 modules wide. Printing processes of any dot-pitch resolution may use GT20 Scanlets, whereas GT15 Scanlets are preferably not used with a low-resolution printing process (less than 5 dots per narrow bar) unless an even number of dots per arrow bar is selected. GT15 and GT20 Scanlets may be read by suitably programmed bar code decoders which have been designed to auto-discriminate them from each other, from standard Scanlets, and from other symbologies.

Except for the differences described herein, the structure of all three versions of Scanlets are as described in the aforementioned application.

a. All three versions of Scanlets preferably use the same Interface Graphic, always printed at the dimensions of standard Scanlets.

b. All three versions of Scarlets preferably use a Finder pattern consisting of a series of four 1X bars interleaved with four narrow spaces (but for GT15 and GT20 Scanlets, the narrow spaces are 1.5X and 2X, respectively). The Interface Graphic is identical for all three versions, and thus the first bar of the Start pattern is always 2X wide. However, the first space of the Start pattern (which is immediately to the left of the first bar of the Finder pattern) is 3X for standard Scanlets, 2.5X for GT15 Scanlets, and 4X for GT20 Scanlets. These patterns were chosen so that one Finder algorithm works with all three versions, while the full Start pattern provides a check that the decode of the Stop pattern indicated the correct version.

c. All three versions of Scanlets preferably use the same set of patterns for data and check characters, with the same values and meanings as standard Scanlets. The only difference is that the three spaces of each pattern are each enlarged (each by 0.5X or 1.0X, for GT15 Scanlets or GT20 Scanlets, respectively).

d. Standard Scanlets, GT15 Scanlets, and GT20 Scanlets preferably have three distinct Stop patterns, with some features in common. All begin with a bar/space sequence 1n1n2n, where 'n' represents a narrow space (1, 1.5, or 2X wide, respectively), and all have a total of 8 bars and spaces, followed by a terminating bar (that may be any width from one to four modules wide). Thus, in all cases, the width of the first six elements of the Stop pattern is less than 75% of the width of the preceding data character. This change in element density is utilized to recognize the Stop pattern. The fourth bar and fourth space of the Stop pattern are (1,1), (4, 1.5), and (2,5) for standard Scanlets, GT15 Scanlets, and GT20 Scanlets, respectively. These patterns were chosen so that a single one-module edge error cannot map to another valid pattern, and so that the versions can be auto-discriminated before the number of space modules per character is known.

The following presents a specific decode algorithm that can auto-discriminate properly between all three versions of Scanlets, while using a common "finding" algorithm in order to minimize the processing requirements (presenting the forward-scan logic only, for simplicity):

1. Find a bar element that is larger than each of the next four bars. To minimize the chance of accidentally accepting a pattern that includes bars that are not in fact nominally smaller than the first one (but are slightly smaller, due to random print defects or scanner noise) reduce the candidate "larger" bar by 1/16 before doing the four comparisons.
2. Check that the first interleaved space is larger than each of the next four spaces; reduce the candidate "larger" space by 1/16 before doing the four comparisons.
3. Verify that the sum of these supposed 8 narrow elements is less than the sum of the next six elements (which should be the first data character), but greater than one-half of that 6-element sum.
4. Verify that for each of the seven T distances of the Finder (not including the two leading elements of the complete Start pattern), each T normalizes to 2 modules when a total of 8 modules is assumed. This works regardless of whether the interleaved spaces are 1X, 1.5X, or 2X wide.
5. Do not decode the two leading T distances of the Start pattern until after the Stop pattern has been verified and decoded. The Stop pattern will tell the decoder which version of Scanlets has been printed, and then these leading T's of the Start pattern can be decoded. This serves as a check that the correct version was identified from the Stop pattern: the leading T's of the Starts have been selected such that, if the wrong version is assumed from a misdecoded Stop, the decode of the Start will not match the expected result.

6. Find the Stop pattern, using the same technique as described for a' standard Scanlet (the first six elements of the new Stop patterns maintain the property that they are less than ¾ the width of a data character). Decode the Stop pattern using the following substeps, to determine which version of Scanlets has been printed.

a) Compare the sum of the six elements just found, to T7, the sum of the next two elements.
      i) If (2*T7) is less than the width of the sum of the previous six elements, then this 8-element Stop pattern indicates a standard Scanlet. Calculate Z based on the first six elements, normalized to 7 modules. Verify that the eight elements decode as a T sequence of 2, 2, 2, 3, 3, 2, 2.
      ii) Otherwise (i.e., (2*T7) is greater than or equal to the width of the sum of the previous six elements):
         (a) if the fourth bar (element seven) is greater than the fourth space (element eight), this indicates a GT15 Scanlet. Calculate Z based on the first six elements, normalized to 8.5 modules. Verify that the eight elements decode as a T sequence of 2.5, 2.5, 2.5, 3.5, 3.5, 5.5, 5.5.
         (b) Otherwise, this indicates a GT20 Scanlet. Calculate Z based on the first six elements, normalized to 10 modules. Verify that the eight elements decode as a T sequence of 3, 3, 3, 4, 4, 4, 7.
   b) Now that the Scanlet version has been determined, and therefore the size of the narrow spaces is known, the leading elements of the Start pattern can be verified. Calculate the value of Z as:

$$Z = (f1 + f3 + f5 + f7)/nModules,$$

Where nModules is 8, 10, or 12, for standard Scanlets, GT15 Scanlets, or GT20 Scanlets, respectively.

Verify that the two measurements (T1, T2) decode to (5, 4) if decoding a standard Scanlet, (4.5, 3.5) if decoding a GT15 Scanlet, or (6, 5) if decoding a GT20 Scanlet. In all cases, each measurement is given a tolerance of +/−0.5Z.

7. Complete the decode of the Start pattern, which serves as a check that the correct version has been discriminated.
8. Complete the decode of the symbol as described for standard Scanlets in the attached specification, except that the character decode now takes into account which version is being scanned (see the Character-Decode Algorithm below). The character set tables do not need to change, nor does the bar-parity table (the bar-parity check changes, in that normalization is against 11, 12.5, or 14 modules, depending on version). Also, to maximize ink-spread tolerance (since these wider-space Scanlets can easily tolerate 100% ink spread), the decoder should do an ink-spread correction on each data character, just before doing its bar parity check. The ink spread of the Start patterns' elements is easily calculated (once it has been determined whether the Scanlet has nominal 1X, 1.5X, or 2X spaces). This initial value would be used to correct the first data character; the first data character's ink spread can then be calculated and applied to the second character, and so forth. To reduce computation time on unsuccessful scans, the entire process of verifying bar parity could be deferred until after the entire Scanlet has been processed, and its check character has been validated.

Character-Decode Algorithm:

The number of modules per symbol character, n, is 11 for standard Scanlets, 12.5 for GT15 Scanlets, and 14 for GT20 Scanlets. The following steps can be used to decode each (11,3) character within a Scanlet:

1. Calculate eight width measurements p, $e_1$, $e_2$, $e_3$, $e_4$, $b_1$, $b_2$, and $b_3$ (see FIG. 4).
2. Convert measurements $e_1$, $e_2$, $e_3$, and $e_4$ to normalized values $E_1$, $E_2$, $E_3$, and E4 which will represent the module width ($E_i$) of these measurements. The following method is used for the i-th value.

For standard Scanlets and GT20 Scanlets:

If $1.5p/n \leq e_i < 2.5p/n$, then $E_i = 2$ for a standard Scanlet, otherwise the character is in error.

If $2.5p/n \leq e_i < 3.5p/n$, then $E_i = 3$

If $3.5p/n \leq e_i < 4.5p/n$, then $E_i = 4$

If $4.5p/n \leq e_i < 5.5p/n$, then $E_i = 5$

If $5.5p/n \leq e_i < 6.5p/n$, then $E_i = 6$

If $6.5p/n \leq e_i < 7.5p/n$, then $E_i = 7$

If $7.5p/n \leq e_i < 8.5p/n$, then $E_i = 8$ for a GT20 Scanlet, otherwise the character is in error.

Otherwise the character is in error.

For GT15 Scanlets only:

If $1.9p/n \leq e_i < 3p/n$, then $E_i = 2$

If $3p/n \leq e_i < 4p/n$, then $E_i = 3$

If $4p/n \leq e_i < 5p/n$, then $E_i = 4$

If $5p/n \leq e_i < 6p/n$, then $E_i = 5$

If $6p/n \leq e_i < 7p/n$, then $E_i = 6$

If $7p/n \leq e_i < 8.15p/n$, then $E_i = 7$

Otherwise the character is in error.

Note that the lower bound for a normalized value of 2, and the upper bound for a normalized value of 7, allow for a small amount of round-off error that can be introduced when a GT Scanlet's X dimension translates to an odd number of printer dots per nominal module.

3. If decoding a GT20 Scanlet, subtract 1 from each of the $E_n$ values calculated above. Look up the character in a decode table using the four values $E_1$, $E_2$, $E_3$, and $E_4$ as the key. This decode table may be found in the Code 128 specification, or may be derived directly from Table 1. If using the decode table in the Code 128 specification, note that the $STOP_A$ and $STOP_B$ patterns are invalid when decoding a Scanlet.

4. Retrieve character self-checking value V which is stored in the table with the character (or which can be derived directly from Table 1). The value V is equal to the sum of the modules for the bars as defined for that character.

5. Verify that $(V-1.75)p/n < (b1+b2+b3) < (V+1.75)p/n$

Otherwise the character is in error.

The calculation indirectly uses character parity to detect all decode errors caused by single non-systematic one-module edge errors.

In the embodiment where only two Scanlet versions are used, the standard Scanlets utilize a subset of the bar and space patterns exactly as defined in the Code 128 specification (although the values assigned to those patterns are different). For improved immunity to excessive print gain, the gain-tolerant variation called GT Scanlets are preferred for Scanlets printed at high densities (an X dimension of 10 mils or below). Although the overall structure is the same, 0.5X is added to the width of each interior space of a GT Scanlet (when encoding, this 0.5X is preferably rounded down to the nearest integer number of printer dots).

Figure 2A:
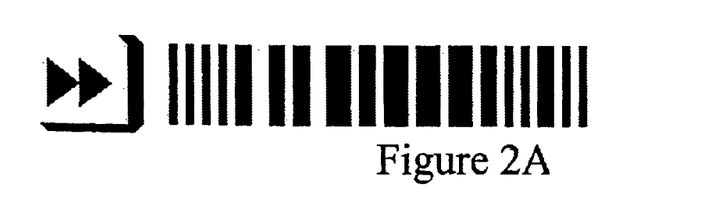
FIG. 2A shows the bar code of FIG. 1.
Figure 2B:
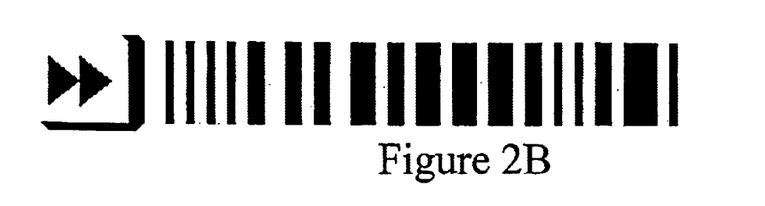
FIG. 2B shows the bar code of FIG. 2A with ink-spread compensation in accordance with the present invention.
Figure 3A:
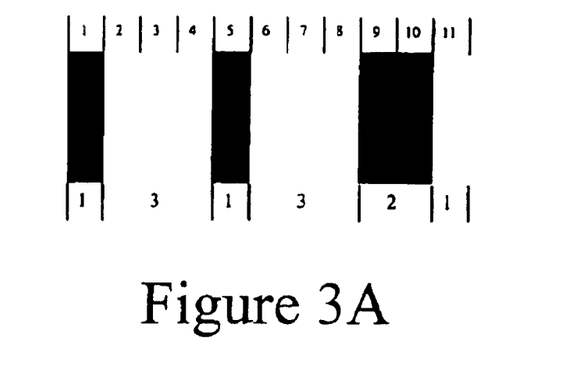
FIG. 3A shows one character of a Scanlet in normal size.
Figure 3B:
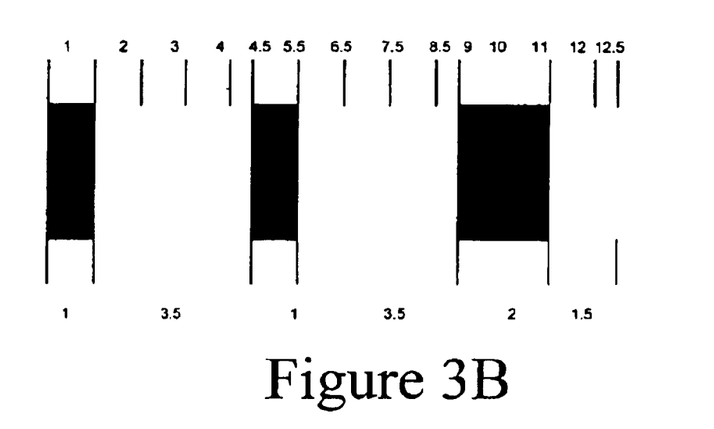
FIG. 3B shows a gain compensated version of FIG. 3A.

A GT Scanlet is shown in FIG. 2B, encoding the same data as FIG. 2A, at the same X dimension. FIG. 3A illustrates the encodation of the pair of digits "34" in a standard Scanlet using symbol character 35. FIG. 3B shows the same data encoded in a GT Scanlet. The bars are exactly as shown in FIG. 3A but each space is 0.5X wider than the FIG. 3A encodation.

Figure 1:
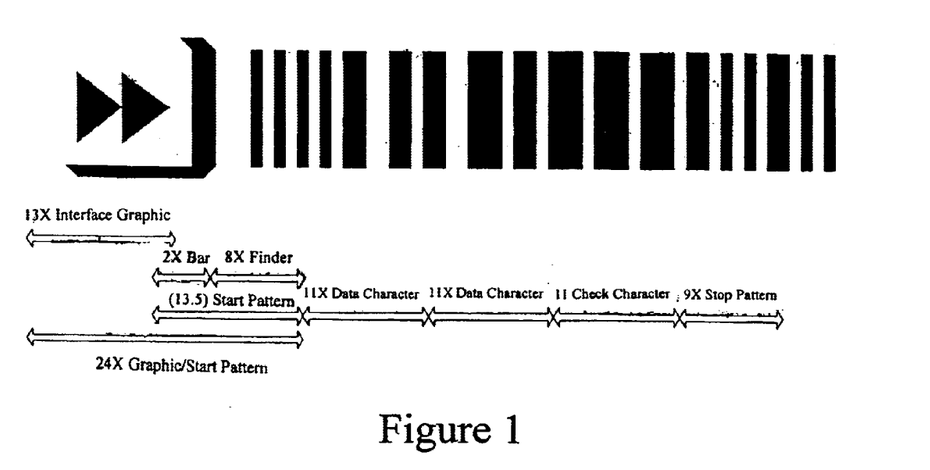
FIG. 1 shows a n,k bar code called a Scanlet without ink-spread compensation intended to be used on different print media along with references to elements thereof.

The Stop pattern of a standard Scanlet, such as shown in FIG. 1, has eight alternating dark and light elements, starting with a bar. The module widths of the Stop pattern elements form the sequence 1, 1, 1, 1, 2, 1, 1, 1. These are followed by a terminating bar or other dark graphical element, between one and four modules wide, whose function is to delineate the one-module width of the last space of the Stop pattern.

In one embodiment of the invention, the Stop pattern of a GT Scanlet has eight alternating dark and light elements, starting with a bar. The module widths of the Stop pattern elements form the sequence 1, 1.5, 1, 1.5, 2, 1.5, 4, 1.5. These are followed by a terminating bar or other dark graphical element, between one and four modules wide, whose function is to delineate the one-module width of the last space of the Stop pattern.

With reference to the scanlet shown in FIG. 1, the Interface Graphic pattern at the left end of a Scanlet has two adjacent dark triangles, bordered by a reverse 'L' which extends 1X above and 1X below the bars of the body of the Scanlet. The bottom edge of the reverse 'L' is nominally 1X high and 13X wide, but is tapered at both ends as shown in FIG. 1. The right edge of the reverse 'L' is 2X wide throughout the central 10X of its height, but is tapered at the top and bottom. In the Scanlet of FIG. 1, the triangles are each 4X wide, nominally 6X high (but this is not a critical dimension), and are positioned vertically to be centered within the height of the bars of the body of the Scanlet. The rightmost triangle ends 2X to the left of the 2X vertical portion of the reverse 'L'. The same Interface Graphic can be printed for both standard and GT Scanlets.

Figure 4:
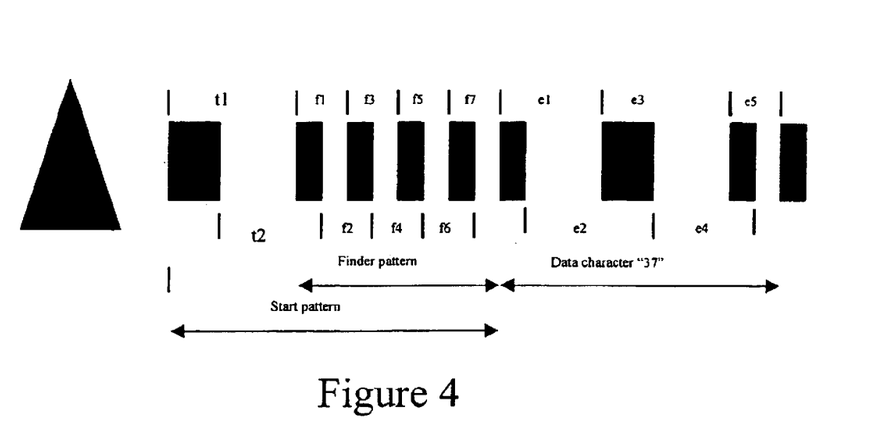
FIG. 4 are the start pattern measurements for a Scanlet.

With regard to decoding, a standard Scanlet and a GT Scanlet can be auto-discriminated and decoded as follows. A candidate Scanlet can be found within a scan line of bar and space measured values, by using the following steps (see FIG. 4 for a representation of the measurements needed to find and validate a Start pattern):

1. To find a Scanlet, perform the following steps at each bar position:
    a) sum the widths of the 8 elements starting from the current bar position. Check that the sum of the next 6 elements is greater than the sum of these 8, but less than 1.5 times the sum of these 8. If so, then divide this sum of eight elements by 8 to obtain "Z", the average module width. Validate these as a candidate Finder pattern with seven edge-to-similar-edge distances between 1.5Z and 2.5Z. For the Scanlet Finder pattern shown in FIG. 4, this step consists of computing Z=(f1+f3+f5+f7)8 and checking that f1 through f7 are each between 1.5Z and 2.5Z.
    b) To look also for a possible reverse scan, sum the current bar width and the prior seven element widths. Check that the sum of the 6 elements prior to these 8 is greater than the sun of these 8, but less than 1.5 times the sum of these 8. If so, divide by sum of the 8 elements by 8 to obtain "Z", the average module width. Check for a trailing Finder pattern with seven edge-to-similar-edge distances between 1.5Z and 2.5Z.
    c) The leading elements of the Start pattern are not checked until after the Stop pattern has been found and decoded (see step 2).
2. Verify that a valid Stop pattern was scanned, starting n elements past the Finder pattern (if enough elements are present in that direction), and starting n elements before the Finder pattern (if enough elements are present in that direction), where n is an even multiple of six, in the range of 18 to 48 inclusive. Search by sunning each set of six elements until a set is reached that, when multiplied by 1.25, is less than the width of the previous group. Then determine which version of Scanlets is present, and decode the stop character accordingly, as follows:
    a) Compare the third and fourth bars of the Stop pattern.
        i) If the third bar is wider than the fourth bar, then this 8-element Stop pattern indicates a standard Scanlet. Calculate Z based on these eight elements, normalized to 9 modules. Verify that the eight elements decode as a T sequence of 2, 2, 2, 3, 3, 2, 2. Also verify that the total width of these 8 elements is less than the total width of the previous six elements, but greater than 0.75 times the total width of the previous six elements.
        ii) Otherwise (i.e., the fourth bar is wider than the third bar), this indicates a GT Scanlet. Calculate Z based on the first eight elements, normalized to 14 modules. Verify that the eight elements decode as a T sequence of 2.5, 2.5, 2.5, 3.5, 3.5, 5.5, 5.5. Also verify that the total width of these 8 elements is greater than the total width of the previous six elements, but less than 1.25 times the total width of the previous eight elements.
    b) Now that the Scanlet version has been determined, and therefore the size of the narrow spaces is known, the leading elements of the Start pattern can be verified. Calculate the value of Z as:

$Z(f1+f3+f5+f7)/nModules$,

Where nModules is 8 or 10, for standard Scanlets or GT Scanlets, respectively. Verify that the first two measurements of the Start pattern (T1, T2) decode to (5, 4) if decoding a standard Scanlet, or to (4.5, 3.5) if decoding a GT15 Scanlet. In either case, each measurement is given a tolerance of +/−0.5Z. Set the scan direction based on the validated Start and Stop patterns.
3. Beginning at the inner end of the Finder pattern, decode the succeeding groups of six elements as standard Code 128 symbol characters in the direction determined from step 3. Continue until either an invalid data character pattern is detected, or until the position of the Stop pattern has been reached. If a group of six elements is of the proper width for a data character, but decodes to a Code 128 value of 33, 62, or 92, the character is invalid. Unless in the check character position, values greater than 102 are also invalid.
4. Verify that the symbol check character calculated is correct. In addition, verify that the symbol contained at least three symbol characters (including the check character, but excluding the Start and Stop patterns) and at most eight symbol characters.
5. Translate the symbol characters into a string of digits. Each symbol character translates directly into a pair of digits (from the "Scanlet Value" column of Table 1),in the range of "00" through "99".
6. In addition, perform such other secondary checks on quiet zones, beam acceleration, absolute timing, dimensions, etc., as are deemed prudent and appropriate considering the specific reading device and intended application environment.

In this algorithm the symbol is decoded using "edge to similar edge" measurements, plus an additional measurement of the sum of the three bar widths to check the parity of each symbol character.

Figure 5:
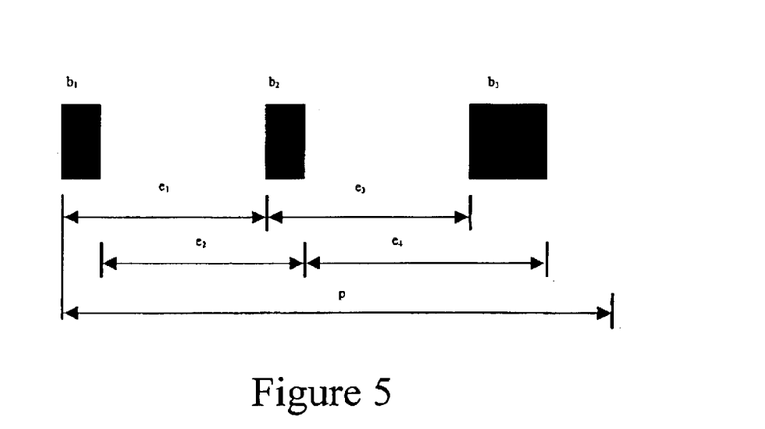
FIG. 5 are character code measurements for a Scanlet.

The number of modules per symbol character, n, is 11 for standard Scanlets, and 12.5 for GT Scanlets. Use the following steps to decode each character within a Scanlet:
1. Calculate eight width measurements p, $e_1$, $e_2$, $e_3$, $e_4$, $b_1$, $b_2$, and $b_3$ (see FIG. 5).
2. Convert measurements $e_1$, $e_2$, $e_3$, and $e_4$ to normalized values $E_1$, $E_2$, $E_3$, and $E_4$ which will represent the module width ($E_i$) of these measurements. The following method is used for the i-th value.
   For standard Scanlets:
   If $1.5p/n \leq e_i < 2.5p/n$, then $E_i=2$
   If $2.5p/n \leq e_i < 3.5p/n$, then $E_i=3$
   If $3.5p/n \leq e_i < 4.5p/n$, then $E_i=4$
   If $4.5p/n \leq e_i < 5.5p/n$, then $E_i=5$
   If $5.5p/n \leq e_i < 6.5p/n$, then $E_i=6$
   If $6.5p/n \leq e_i < 7.5p/n$, then $E_i=7$
   Otherwise the character is in error.
   For GT Scanlets:
   If $1.9p/n \leq e_i < 3p/n$, then $E_i=2$
   If $3p/n \leq e_i < 4p/n$, then $E_i=3$
   If $4p/n \leq e_i < 5p/n$, then $E_i=4$
   If $5p/n \leq e_i < 6p/n$, then $E_i=5$
   If $6p/n \leq e_i < 7p/n$, then $E_i=6$
   If $7p/n \leq e_i < 8.15p/n$, then $E_i=7$
   Otherwise the character is in error.
   Note that the lower bound for a normalized value of 2, and the upper bound for a normalized value of 7, allow for a small amount of round-off error that can be introduced when a GT Scanlet's X dimension translates to an odd number of printer dots per nominal module.
3. Look up the character in a decode table using the four values $E_1$, $E_2$, $E_3$, and $E_4$ as the key. This decode table may be found in the Code 128 specification, or may be derived directly from Table I. If using the decode table in the Code 128 specification, note that the $STOP_A$ and $STOP_B$ patterns are invalid when decoding a Scanlet.
4. Retrieve character self-checking value V which is stored in the table with the character (or which can be derived directly from Table I). The value V is equal to the sum of the modules for the bars as defined for that character.
5. Verify that $(V-1.75)p/n < (b1+b2+b3) < (V+1.75)p/n$. Otherwise the character is in error.

The calculation indirectly uses character parity to detect all decode errors caused by single non-systematic one-module edge errors.

The Start pattern of a standard Scanlet has five bars and five spaces comprising 13 modules. The Stop pattern has four bars and four spaces comprising nine modules, terminated by a dark element at least one module wide. The decodability of the Start and Stop patterns can be measured using the standard verification formula for V used above, but substituting n=13 or n=9, rather than n=11, to reflect the lengths of those patterns.

The Start pattern of a GT Scanlet has five bars and five spaces comprising 14.5 modules. The Stop pattern has four bars and four spaces comprising fourteen modules, terminated by a dark element at least one module wide. The decodability of the Start and Stop patterns can be measured using the standard formula based on V and used above, but substituting n=14.5 or n=14, rather than n=12.5, to reflect the lengths of those patterns.

The seven edge-to-similar-edge distances in the Finder pattern preferably are each 2.0+/−0.315Z, the measurement labeled t1 in FIG. 4 preferably is 5.0+/−0.315Z, and the measurement labeled t2 in FIG. 4 preferably is 4.0+/−0.315Z. For these measurements, Z is the average measured module width over the eight modules of the Finder Pattern.

The width of the terminating dark element to the right of the Stop pattern preferably is at least 1X wide, but no more than 4X wide. An extra edge-to-similar-edge measurement T, summing the last space of the Stop pattern and the terminating dark element, can be made on each scan reflectance profile. Using the value of Z from the Stop pattern, each scan reflectance profile under ISO/IEC 15416 preferably can be measured and graded as follows:

T>=1.685Z and T<=5.75Z: Grade 4

T<1.685Z or T>5.75Z: Grade 0

As is well known in the art, graphics software used to create bar codes on pixel-based printers must scale each bar and space exactly to the pixel pitch of the printer or digital imaging system being used. For edge to similar edge decodable symbologies, like Scanlets, the number of pixels comprising each symbol character must be a fixed and constant integer multiple of the number of modules in the symbol character. For Scanlets, the number of modules is 11 for symbol character values 0 to 105. Therefore, a given printer can only print a certain set of X dimensions.

Compensation for uniform bar width growth (or loss) should be in equal offsetting amounts on all bars and spaces in the symbol. This can be accomplished by changing an integer number of pixels from dark to light or light to dark in the same manner for each bar-space pair in the symbol. For example, a vertical column of pixels along the same edge (leading or trailing) of every bar in the symbol could be changed from dark to light. Alternatively, pixels along both edges of every bar in the symbol could be changed from dark to light, provided that the printer resolution is sufficient to allow this to be performed uniformly. Any set of dark to light or light to dark pixel changes is acceptable provided the adjustment is performed consistently across the whole symbol and does not change the edge to similar edge measurements or the total symbol character width. Failure to follow these principles can result in degraded symbol quality and unreadable symbols.

General-purpose printing software designed to support a wide range of printers can be used to provide a user with the capability of adjusting the X dimension and bar width growth or loss.

(a) Programmer's Example

The principles discussed above can be reduced to the following set of rules useful for digital bar code design files:

1. Convert the desired X dimension to a module size in pixels, rounded down to the nearest integer (or rounded up, if rounding down would cause the X dimension to fall below the minimum for this application).
2. Determine the number of pixels corresponding to the desired compensation for uniform bar width growth, and round up to the next larger integer (or round down, if rounding up would cause the pixels per dark module to fall below one-half the nominal number of pixels per modules determined above). If compensation for bar width reduction, rather than bar width growth, is needed, perform the equivalent rounding (that is, round up, unless rounding up would cause the pixels per light module to fall below one-half of nominal).
3. Apply the above results to determine the pixel count of every bar and space in the symbol.

EXAMPLE

Using a printing device that has 24 dots per mm, a digital bar code design file is created for a 0.27 mm×dimension symbol with 0.06 mm of bar width reduction.

The module size is 24 dots/mm X 0.27 mm/module=6.5 pixels, which rounds down to 6 pixels per module.

The desired bar growth compensation is 0.06 mm×24 pixels/mm=1.4 pixels, which rounds up to 2 pixels. This process results in the following pixel count for bars and spaces as illustrated in Table V.

As noted above, one should also consider how a 1.5X spacing will be affected by printing on a printer where the number of dots for a single module width is an odd number. The decision by the software for printing the bar code would be whether to round up or round down. Tables III and IV illustrate the errors that are introduced by rounding down and rounding up respectively. Rounding the fractional spaces down by one-half dot, rather than up, is advantageous, as can be seen by comparing Table III with Table IV. Table III shows that rounding down causes the inherent decoding error for the smallest and largest T distances to move the decision points away from the nearest valid neighboring T choices. In contrast, rounding up (shown in Table IV) causes these "outermost" decision points to move closer to the nearest valid neighboring choices, which increases the probability that any additional printing imperfections, added to this inherent inaccuracy, will cause the decode process to fail. The decode algorithms disclosed herein take advantage of this round-off-error "directionality" when setting the thresholds for the largest and smallest T distances.

It will be understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

TABLE I

| C128 Value | Scanlet Value | B | S | B | S | B | S |
|---|---|---|---|---|---|---|---|
| 00 | 00 | 2 | 1 | 2 | 2 | 2 | 2 |
| 01 | 01 | 2 | 2 | 2 | 1 | 2 | 2 |
| 02 | 02 | 2 | 2 | 2 | 2 | 2 | 1 |
| 03 | 03 | 1 | 2 | 1 | 2 | 2 | 3 |
| 04 | 04 | 1 | 2 | 1 | 3 | 2 | 2 |
| 05 | 05 | 1 | 3 | 1 | 2 | 2 | 2 |
| 06 | 06 | 1 | 2 | 2 | 2 | 1 | 3 |
| 07 | 07 | 1 | 2 | 2 | 3 | 1 | 2 |
| 08 | 08 | 1 | 3 | 2 | 2 | 1 | 2 |
| 09 | 09 | 2 | 2 | 1 | 2 | 1 | 3 |
| 10 | 10 | 2 | 2 | 1 | 3 | 1 | 2 |
| 11 | 11 | 2 | 3 | 1 | 2 | 1 | 2 |
| 12 | 12 | 1 | 1 | 2 | 2 | 3 | 2 |
| 13 | 13 | 1 | 2 | 2 | 1 | 3 | 2 |
| 14 | 14 | 1 | 2 | 2 | 3 | 3 | 1 |
| 15 | 15 | 1 | 1 | 3 | 2 | 2 | 2 |
| 16 | 16 | 1 | 2 | 3 | 1 | 2 | 2 |
| 17 | 17 | 1 | 2 | 3 | 2 | 2 | 1 |
| 18 | 18 | 2 | 2 | 3 | 2 | 1 | 1 |
| 19 | 19 | 2 | 2 | 1 | 1 | 3 | 2 |
| 20 | 20 | 2 | 2 | 1 | 2 | 3 | 1 |
| 21 | 21 | 2 | 1 | 3 | 2 | 1 | 2 |
| 22 | 22 | 2 | 2 | 3 | 1 | 1 | 2 |
| 23 | 23 | 3 | 1 | 2 | 1 | 3 | 1 |
| 24 | 24 | 3 | 1 | 1 | 2 | 2 | 2 |
| 25 | 25 | 3 | 2 | 1 | 1 | 2 | 2 |
| 26 | 26 | 3 | 2 | 1 | 2 | 2 | 1 |
| 27 | 27 | 3 | 1 | 2 | 2 | 1 | 2 |
| 28 | 28 | 3 | 2 | 2 | 1 | 1 | 2 |
| 29 | 29 | 3 | 2 | 2 | 2 | 1 | 1 |
| 30 | 30 | 2 | 1 | 2 | 1 | 2 | 3 |
| 31 | 31 | 2 | 1 | 2 | 3 | 2 | 1 |
| 32 | 32 | 2 | 3 | 2 | 1 | 2 | 1 |
| 33 | N/A | 1 | 1 | 1 | 3 | 2 | 3 |
| 34 | 33 | 1 | 3 | 1 | 1 | 2 | 3 |
| 35 | 34 | 1 | 3 | 1 | 3 | 2 | 1 |
| 36 | 35 | 1 | 1 | 2 | 3 | 1 | 3 |
| 37 | 36 | 1 | 3 | 2 | 1 | 1 | 3 |
| 38 | 37 | 1 | 3 | 2 | 3 | 1 | 1 |
| 39 | 38 | 2 | 1 | 1 | 3 | 1 | 3 |
| 40 | 39 | 2 | 3 | 1 | 1 | 1 | 3 |
| 41 | 40 | 2 | 3 | 1 | 3 | 1 | 1 |
| 42 | 41 | 1 | 1 | 2 | 1 | 3 | 3 |
| 43 | 42 | 1 | 1 | 2 | 3 | 3 | 1 |
| 44 | 43 | 1 | 3 | 2 | 1 | 3 | 1 |
| 45 | 44 | 1 | 1 | 3 | 1 | 2 | 3 |
| 46 | 45 | 1 | 1 | 3 | 3 | 2 | 1 |
| 47 | 46 | 1 | 3 | 3 | 1 | 2 | 1 |
| 48 | 47 | 3 | 1 | 3 | 1 | 2 | 1 |
| 49 | 48 | 2 | 1 | 1 | 3 | 3 | 1 |
| 50 | 49 | 2 | 3 | 1 | 1 | 3 | 1 |
| 51 | 50 | 2 | 1 | 3 | 1 | 1 | 3 |
| 52 | 51 | 2 | 1 | 3 | 3 | 1 | 1 |
| 53 | 52 | 2 | 1 | 3 | 1 | 3 | 1 |
| 54 | 53 | 3 | 1 | 1 | 1 | 2 | 3 |
| 55 | 54 | 3 | 1 | 1 | 3 | 2 | 1 |
| 56 | 55 | 3 | 3 | 1 | 1 | 2 | 1 |
| 57 | 56 | 3 | 1 | 2 | 1 | 1 | 3 |
| 58 | 57 | 3 | 1 | 2 | 3 | 1 | 1 |
| 59 | 58 | 3 | 3 | 2 | 1 | 1 | 1 |
| 60 | 59 | 3 | 1 | 4 | 1 | 1 | 1 |
| 61 | 60 | 2 | 2 | 1 | 4 | 1 | 1 |
| 62 | N/A | 4 | 3 | 1 | 1 | 1 | 1 |
| 63 | 61 | 1 | 1 | 1 | 2 | 2 | 4 |
| 64 | 62 | 1 | 1 | 1 | 4 | 2 | 2 |
| 65 | 63 | 1 | 2 | 1 | 1 | 2 | 4 |
| 66 | 64 | 1 | 2 | 1 | 4 | 2 | 1 |
| 67 | 65 | 1 | 4 | 1 | 1 | 2 | 2 |
| 68 | 66 | 1 | 4 | 1 | 2 | 2 | 1 |
| 69 | 67 | 1 | 1 | 2 | 2 | 1 | 4 |
| 70 | 68 | 1 | 1 | 2 | 4 | 1 | 2 |
| 71 | 69 | 1 | 2 | 2 | 1 | 1 | 4 |
| 72 | 70 | 1 | 2 | 2 | 4 | 1 | 1 |
| 73 | 71 | 1 | 4 | 2 | 1 | 1 | 2 |
| 74 | 72 | 1 | 4 | 2 | 2 | 1 | 1 |
| 75 | 73 | 2 | 4 | 1 | 2 | 1 | 1 |
| 76 | 74 | 2 | 2 | 1 | 1 | 1 | 4 |
| 77 | 75 | 4 | 1 | 3 | 1 | 1 | 1 |
| 78 | 76 | 2 | 4 | 1 | 1 | 1 | 2 |
| 79 | 77 | 1 | 3 | 4 | 1 | 1 | 1 |
| 80 | 78 | 1 | 1 | 1 | 2 | 4 | 2 |
| 81 | 79 | 1 | 2 | 1 | 1 | 4 | 2 |
| 82 | 80 | 1 | 2 | 1 | 2 | 4 | 1 |
| 83 | 81 | 1 | 1 | 4 | 2 | 1 | 2 |
| 84 | 82 | 1 | 2 | 4 | 1 | 1 | 2 |
| 85 | 83 | 1 | 2 | 4 | 2 | 1 | 1 |
| 86 | 84 | 4 | 1 | 1 | 2 | 1 | 2 |
| 87 | 85 | 4 | 2 | 1 | 1 | 1 | 2 |
| 88 | 86 | 4 | 2 | 1 | 2 | 1 | 1 |
| 89 | 87 | 2 | 1 | 2 | 1 | 4 | 1 |
| 90 | 88 | 2 | 1 | 4 | 1 | 2 | 1 |
| 91 | 89 | 4 | 1 | 2 | 1 | 2 | 1 |
| 92 | N/A | 1 | 1 | 1 | 1 | 4 | 3 |
| 93 | 90 | 1 | 1 | 1 | 3 | 4 | 1 |
| 94 | 91 | 1 | 3 | 1 | 1 | 4 | 1 |
| 95 | 92 | 1 | 1 | 4 | 1 | 1 | 3 |
| 96 | 93 | 1 | 1 | 4 | 3 | 1 | 1 |
| 97 | 94 | 4 | 1 | 1 | 1 | 1 | 3 |
| 98 | 95 | 4 | 1 | 1 | 3 | 1 | 1 |
| 99 | 96 | 1 | 3 | 1 | 1 | 4 | 1 |
| 100 | 97 | 1 | 1 | 4 | 1 | 3 | 1 |
| 101 | 98 | 3 | 1 | 1 | 1 | 4 | 1 |
| 102 | 99 | 4 | 1 | 1 | 1 | 3 | 1 |
| 103 | (100) | 2 | 1 | 1 | 4 | 1 | 2 |

TABLE I-continued

| C128 Value | Scanlet Value | B | S | B | S | B | S |
|---|---|---|---|---|---|---|---|
| 104 | (101) | 2 | 1 | 1 | 2 | 1 | 4 |
| 105 | (102) | 2 | 1 | 1 | 2 | 3 | 2 |

TABLE II

Pattern: T-Distances:
bsbsbs val = 0: 111134 T: 22247
val = 1: 111233 T: 22356
val = 2: 111314 T: 22445
val = 3: 111332 T: 22465
val = 4: 111413 T: 22554
val = 5: 111431 T: 22574
val = 6: 112124 T: 23336
val = 7: 112142 T: 23356
val = 8: 112223 T: 23445
val = 9: 112241 T: 23465
val = 10: 112322 T: 23554
val = 11: 112421 T: 23663
val = 12: 113114 T: 24425
val = 13: 113132 T: 24445
val = 14: 113213 T: 24534
val = 15: 113231 T: 24554
val = 16: 113312 T: 24643
val = 17: 113411 T: 24752
val = 18: 114122 T: 25534
val = 19: 114221 T: 25643
val = 20: 121133 T: 33246
val = 21: 121214 T: 33335
val = 22: 121232 T: 33355
val = 23: 121313 T: 33444
val = 24: 121331 T: 33464
val = 25: 121412 T: 33553
val = 26: 122123 T: 34335
val = 27: 122141 T: 34355
val = 28: 122222 T: 34444
val = 29: 122321 T: 34553
val = 30: 123113 T: 35424
val = 31: 123131 T: 35444
val = 32: 123212 T: 35533
val = 33: 123311 T: 35642
val = 34: 124121 T: 36533
val = 35: 131114 T: 44225
val = 36: 131132 T: 44245
val = 37: 131213 T: 44334
val = 38: 131231 T: 44354
val = 39: 131312 T: 44443
val = 40: 131411 T: 44552
val = 41: 132122 T: 45334
val = 42: 132221 T: 45443
val = 43: 133112 T: 46423
val = 44: 133211 T: 46532
val = 45: 141113 T: 55224
val = 46: 141131 T: 55244
val = 47: 141212 T: 55333
val = 48: 141311 T: 55442
val = 49: 142121 T: 56333
val = 50: 143111 T: 57422
val = 51: 211124 T: 32236
val = 52: 211142 T: 32256
val = 53: 211223 T: 32345
val = 54: 211241 T: 32365
val = 55: 211322 T: 32454
val = 56: 211421 T: 32563
val = 57: 212114 T: 33325
val = 58: 212132 T: 33345
val = 59: 212213 T: 33434
val = 60: 212231 T: 33454
val = 61: 212312 T: 33543
val = 62: 212411 T: 33652
val = 63: 213122 T: 34434
val = 64: 213221 T: 34543

TABLE II-continued

Pattern: T-Distances:
bsbsbs val = 65: 214112 T: 35523
val = 66: 214211 T: 35632
val = 67: 221123 T: 43235
val = 68: 221141 T: 43255
val = 69: 221222 T: 43344
val = 70: 221321 T: 43453
val = 71: 222113 T: 44324
val = 72: 222131 T: 44344
val = 73: 222212 T: 44433
val = 74: 222311 T: 44542
val = 75: 223121 T: 45433
val = 76: 224111 T: 46522
val = 77: 231122 T: 54234
val = 78: 231221 T: 54343
val = 79: 232112 T: 55323
val = 80: 232211 T: 55432
val = 81: 241121 T: 65233
val = 82: 242111 T: 66322
val = 83: 311114 T: 42225
val = 84: 311132 T: 42245
val = 85: 311213 T: 42334
val = 86: 311231 T: 42354
val = 87: 311312 T: 42443
val = 88: 311411 T: 42552
val = 89: 312122 T: 43334
val = 90: 312221 T: 43443
val = 91: 313112 T: 44423
val = 92: 313211 T: 44532
val = 93: 321113 T: 53224
val = 94: 321131 T: 53244
val = 95: 321212 T: 53333
val = 96: 321311 T: 53442
val = 97: 322121 T: 54333
val = 98: 323111 T: 55422
val = 99: 331112 T: 64223
val = 100: 331211 T: 64332
val = 101: 341111 T: 75222
val = 102: 411122 T: 52234
val = 103: 411221 T: 52343
val = 104: 412112 T: 53323
val = 105: 412211 T: 53432
val = 106: 421121 T: 63233
val = 107: 422111 T: 64322

TABLE III

Rounding error for GT15, for odd numbers of dots per bar:

| nBar | 3 | 5 | 7 | 9 | 11 | 13 |
|---|---|---|---|---|---|---|
| SpaceAdd | 1 | 2 | 3 | 4 | 5 | 6 |
| T: | | | | | | |
| 2 | 2.431 | 2.459 | 2.471 | 2.477 | 2.482 | 2.484 |
| 3 | 3.472 | 3.484 | 3.488 | 3.491 | 3.493 | 3.494 |
| 4 | 4.514 | 4.508 | 4.506 | 4.505 | 4.504 | 4.503 |
| 5 | 5.556 | 5.533 | 5.523 | 5.518 | 5.515 | 5.512 |
| 6 | 6.597 | 6.557 | 6.541 | 6.532 | 6.526 | 6.522 |
| 7 | 7.639 | 7.582 | 7.558 | 7.545 | 7.537 | 7.531 |
| error: | | | | | | |
| T2: | −0.069 | −0.041 | −0.029 | −0.023 | −0.018 | −0.016 |
| T3: | −0.028 | −0.016 | −0.012 | −0.009 | −0.007 | −0.006 |
| T4: | 0.014 | 0.008 | 0.006 | 0.005 | 0.004 | 0.003 |
| T5: | 0.056 | 0.033 | 0.023 | 0.018 | 0.015 | 0.012 |
| T6: | 0.097 | 0.057 | 0.041 | 0.032 | 0.026 | 0.022 |
| T7: | 0.139 | 0.082 | 0.058 | 0.045 | 0.037 | 0.031 |

TABLE IV

Rounding error for GT15, for odd numbers of dots per bar:

| nBar | 3 | 5 | 7 | 9 | 11 | 13 |
|---|---|---|---|---|---|---|
| SpaceAdd | 2 | 3 | 4 | 5 | 6 | 7 |
| T: | | | | | | |
| 2 | 2.564 | 2.539 | 2.528 | 2.522 | 2.518 | 2.515 |
| 3 | 3.526 | 3.516 | 3.511 | 3.509 | 3.507 | 3.506 |
| 4 | 4.487 | 4.492 | 4.494 | 4.496 | 4.496 | 4.497 |
| 5 | 5.449 | 5.469 | 5.478 | 5.482 | 5.486 | 5.488 |
| 6 | 6.410 | 6.445 | 6.461 | 6.469 | 6.475 | 6.479 |
| 7 | 7.372 | 7.422 | 7.444 | 7.456 | 7.464 | 7.470 |
| error: | | | | | | |
| T2: | 0.064 | 0.039 | 0.028 | 0.022 | 0.018 | 0.015 |
| T3: | 0.026 | 0.016 | 0.011 | 0.009 | 0.007 | 0.006 |
| T4: | −0.013 | −0.008 | −0.006 | −0.004 | −0.004 | −0.003 |
| T5: | −0.051 | −0.031 | −0.022 | −0.018 | −0.014 | −0.012 |
| T6: | −0.090 | −0.055 | −0.039 | −0.031 | −0.025 | −0.021 |
| T7: | −0.128 | −0.078 | −0.056 | −0.044 | −0.036 | −0.030 |

TABLE V

Correcting pixels for imaging resolution and bar width reduction

| Module Count | Pixel Count | |
|---|---|---|
| | Bars | Spaces |
| 1 | 4 | 8 |
| 2 | 10 | 14 |
| 3 | 16 | 20 |
| 4 | 22 | 26 |

What is claimed is:

1. A method of producing an ink-spread compensated variant of an existing optical code encodation scheme comprising the steps of:

determining a pattern of printed areas and spaces in the existing encodation scheme for a data input; the printed areas and spaces each having a respective length in at least one dimension as a function of a given unit length for encoding information; and adding a predetermined length to the length of each space while the length of each printed area remains unchanged to produce a modified code symbol.

2. The method according to claim 1, wherein the existing optical code encodation scheme is a binary code encodation scheme.

3. The method according to claim 2, wherein the existing binary code encodation scheme is for an existing binary code symbology.

4. The method according to claim 1, wherein the existing optical code encodation scheme is a bar code encodation scheme.

5. The method according to claim 4, wherein the existing bar code encodation scheme is for an existing bar code symbology.

6. The method according to claim 4, wherein the bar code encodation scheme encodes a bar code having bars of varying lengths and spaces of varying lengths at least equal to a length of a narrowest space, and wherein the predetermined length is a function of the length of the narrowest space.

7. The method according to claim 6, wherein the bar code is an n,k bar code and wherein the predetermined length is a function of a module width of the resulting bar code symbol.

8. The method according to claim 7, further comprising adding auto-discrimination to the modified code symbol to enable a reader to determine that the modified code symbol is an ink-spread compensated variant for the decoding thereof and the amount of added length to each space.

9. The method according to claim 7, wherein the predetermined length is x modules, $0<x\leq 2$.

10. The method according to claim 9, wherein the predetermined length is 0.5 modules.

11. The method according to claim 9, wherein the predetermined length is 1 module.

12. The method according to claim 7, wherein the n,k bar code is an 11,3 bar code having bars and spaces with respective lengths varying from 1 to 4 modules.

13. The method according to claim 12, wherein the predetermined length is x modules, $0<x\leq 2$.

14. The method according to claim 13, wherein the predetermined length is 0.5 modules.

15. The method according to claim 13, wherein the predetermined length is 1 module.

16. The method according to claim 1, wherein the encodation scheme encodes a two-dimensional code symbology.

17. The method according to claim 16, wherein the two-dimensional code symbology is an n,k bar code and wherein the added predetermined length is a function of a module length of the resulting bar code symbol.

18. The method according to claim 17, wherein the bar code is PDF417.

19. The method according to claim 1, further comprising the steps of:

dividing the encodation scheme into at least a first and a second set of data characters; and the step of determining selecting the pattern from the second set, the different characters in the first and second sets providing an auto-discrimination feature to identify an ink-spread compensated code symbol.

20. The method according to claim 1, further comprising the step of adding at least one auto-discrimination feature to the modified code symbol to enable a reader to determine that the modified code symbol is an ink-spread compensated variant for the decoding thereof.

21. The method according to claim 20, further comprising the step of adding a data character pattern to the modified code symbol to identify the modified code symbol as an ink-spread compensated variant.

22. The method according to claim 20, wherein code symbols generated according to the existing optical code encodation scheme have an existing first start pattern and an existing first stop pattern, the step of adding auto-discrimination comprising at least one of (a) using a second start pattern in place of the existing first start pattern in the modified code symbol, and (b) using a second stop pattern in place of the existing stop pattern in the modified code symbol.

23. The method according to claim 20, wherein code symbols generated according to the existing optical code encodation scheme have a first finder pattern and wherein the step of adding auto-discrimination comprises providing a second finder pattern in the modified code symbol in place of the first finder pattern.

24. In a method for decoding an ink-spread compensated variant of an existing n, k bar encodation scheme produced in accordance with claim 23, the improvement comprising the steps of:

discriminating that the bar code symbol is an ink-spread compensated variant and determining the amount of the added length;

normalizing the width of a character to add the total added length; and varying the threshold for the spaces to compensate for the length added thereto.

* * * * *